Sept. 25, 1928.　　　　S. LOEWE　　　　1,685,426

STATION SCALE

Filed March 2, 1927

INVENTOR
SIEGMUND LOEWE
BY
ATTORNEY

Patented Sept. 25, 1928.

1,685,426

UNITED STATES PATENT OFFICE.

SIEGMUND LOEWE, OF BERLIN-FRIEDENAU, GERMANY, ASSIGNOR TO RADIO CORPORATION OF AMERICA, A CORPORATION OF DELAWARE.

STATION SCALE.

Application filed March 2, 1927, Serial No. 172,136, and in Germany October 22, 1925.

This invention relates to an indicating device and more particularly to a scale for showing the station setting of a radio receiver apparatus.

In using receiving apparatus, it has proved particularly convenient to directly imprint the names of the stations, which are picked up on turning the condenser dial, upon the scale of the condenser. In this manner, by the aid of the station scale, it is an easy thing to know the different stations within the range of the equipment, as well as to change the setting of the apparatus.

However, in view of the increasing number of broadcasting stations and the continuously-growing range of receiving apparatus, there arises a difficulty, namely, the impossibility of imprinting the names of all of the stations within the range of the set together with graduations upon the ordinary scale, since the number of stations is so great. Further, the tuning to any individual station becomes too difficult since by a slight shift of the ordinary dial in either direction another station is often picked up.

It is an object of this invention to provide an indicating means which may be used to indicate conveniently a large number of settings.

The suggestion has already been made to spread the scale apart, as it were, by the aid of gearing, with the result that several turns of a gear will produce only one turn of the condenser through an angle of 180 degrees. For the purposes of the present invention, such a transmission gear is used with the end in view of obtaining more space for imprinting station names and calibration lines.

In the accompanying drawing Figure 1 is an elevation partly in section of a device using my improved indicating means.

Figure 1:
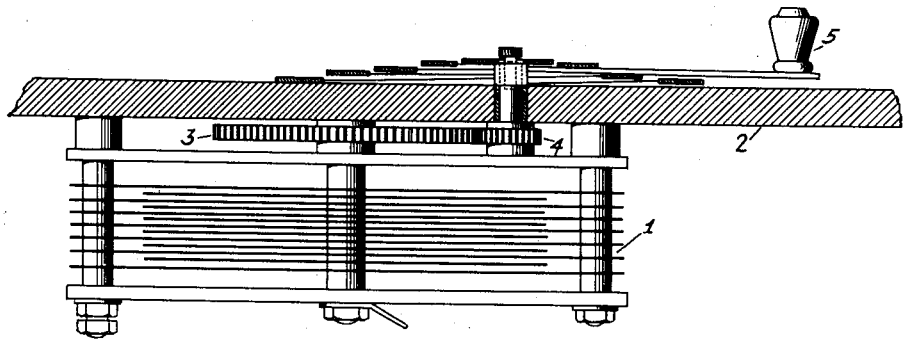

Referring to Figure 1, 1 is a rotary condenser which is mounted on the apparatus plate 2. Upon the spindle of the condenser is a large gear 3 which meshes a small toothwheel 4. The transformation ratio is so chosen that a relatively large number of rotations of wheel 4 will result in only a half rotation of wheel 3 and consequently of the condenser. It is necessary to make any given position of the condenser, in spite of several complete rotations of the driving wheel 4, readable in such a ready and clear manner that there can be no doubt with reference to its setting. This end is insured by the aid of an arrangement of which a sectional view is shown in Figure 1 and a top view in Figure 2.

Figure 3:
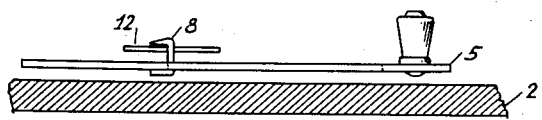
Figure 3 is an elevation partly in section of a modification wherein a "jockey" is used as an indicator.
Figure 5:
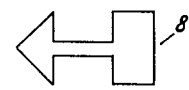
Figure 5 is a plan view of a stamping from which the "jockey" may be bent into shape for use as an indicating hand and, Figure 6 is a view partly in section of the operating mechanism of a proposed modification.
Figure 4:
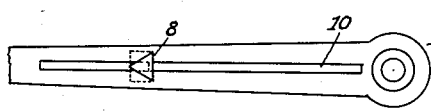
Figure 4 is a plan view of a portion of an operating lever with the "jockey" in place.

Attached to the shaft wheel 4 is a rotary arm 5 which, in accordance with the transformation-ratio between wheels 3 and 4, makes a number of revolutions. As shown in the drawing, four complete revolutions are required in order to produce a half revolution of the condenser. The essential feature of the invention resides in the fact that the scale dial is cut open or notched spirally, and that in the cutting line on the dial either the set lever 5 itself is made to slide, or else a jockey 8, as shown in Figures 3 to 5, carried by the set lever, is caused to be guided in a slot of the set lever, and which is shifted inwardly or outwardly by the spiral. The said jockey is constructed to act as a hand or pointer adapted to indicate the particular wavelength or station to which the device is adjusted.

Figure 2:
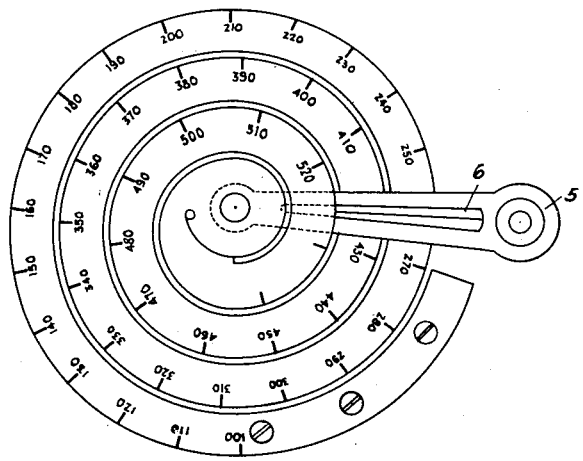
Figure 2 is a plan view of my improved indicating element.

In the embodiment illustrated in Figures 1 and 2 of the drawing, the set arm or lever 5 itself is caused to slide through the spiral groove in the scale or dial. The line 6 indicates the exact setting of the condenser. Upon adjustment of the set lever 5 portions of the set lever and dial are covered. There will never be any doubt, therefore, as to what the setting is. For imprinting the station names and the calibration lines, there is available the whole area of the spirally cut dial, as shown in Figure 2.

Figure 6:
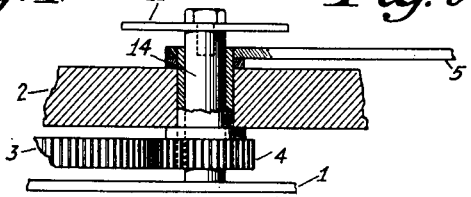

When a jockey is used, the set lever may be allowed to slip underneath the entire dial. In such a case (see Figure 6) the spiral scale 12 may be fastened to a stationary shaft 14 fastened to the condenser 1. Around this may be placed a tube or sleeve to which is fastened pinion 4 and the actuating handle 5, which is, of course, slotted. In the slot and in the spiral groove in the dial, the jockey is positively guided in such a manner that whenever a station is picked up it will be directly indicated on the scale.

It is furthermore of special advantage that the present device at the same time makes use of a distinct fine-adjustment means for the condenser since the gear 3 and pinion 4 insure a very delicate setting of the condenser.

Having thus described my invention what I claim is:

1. An arrangement for varying and indicating the angular position of a rotatable member comprising a reduction driving system for said rotatable member, an indicating scale comprising a flat spiral coil separated between its turns cooperating with the driving end of the system, the driving end of the system comprising a flat member extending through the separations between the spiral coils, and means on said flat member indicating on said scale the angular position of the driving end of the system.

2. An indicating apparatus comprising a flat spiral coil of quadrangular cross-section, the successive turns of which are separated so as to allow a flat member to extend through the spiral separations and means on said flat member for indicating on said scale the relative angular position of the flat member on the scale.

3. Indicating and actuating apparatus for a rotatable element comprising a shaft fixed at its lower end to a stationary member, a flat spiral scale fixed to the upper end of said shaft, a cylindrical sleeve rotatably mounted on the intermediate portion of the shaft, a flat actuating lever having a slot therein fixed to the sleeve, and a rider extending through the slot in the actuating lever and through the turns of the flat spiral scale having a bent portion engaging the under surface of the lever and a pointer portion engaging the upper surface of the scale.

SIEGMUND LOEWE